(12) United States Patent
Sugae et al.

(10) Patent No.: US 11,852,715 B2
(45) Date of Patent: Dec. 26, 2023

(54) OBJECT DETECTOR

(71) Applicant: AISIN CORPORATION, Kariya (JP)

(72) Inventors: Ippei Sugae, Kariya (JP); Koichi Sassa, Kariya (JP)

(73) Assignee: AISIN CORPORATION, Kariya (JP)

( * ) Notice: Subject to any disclaimer, the term of this patent is extended or adjusted under 35 U.S.C. 154(b) by 343 days.

(21) Appl. No.: 17/202,644

(22) Filed: Mar. 16, 2021

(65) Prior Publication Data

US 2021/0389446 A1    Dec. 16, 2021

(30) Foreign Application Priority Data

Jun. 12, 2020 (JP) ................. 2020-102611

(51) Int. Cl.
*G01S 13/56* (2006.01)
*G01S 13/931* (2020.01)

(52) U.S. Cl.
CPC ............ *G01S 13/56* (2013.01); *G01S 13/931* (2013.01)

(58) Field of Classification Search
CPC ................................ G01S 13/56; G01S 13/931
USPC .......................................................... 342/28
See application file for complete search history.

(56) References Cited

U.S. PATENT DOCUMENTS

| | | | | |
|---|---|---|---|---|
| 4,608,566 A * | 8/1986 | Ennis | ........ | G01S 13/32 342/149 |
| 6,018,309 A * | 1/2000 | Mitsumoto | ........ | G01S 13/343 342/99 |
| 6,081,223 A * | 6/2000 | Kitahara | ........ | G01S 13/931 342/72 |
| 10,759,343 B2 * | 9/2020 | Leem | ........ | B60W 50/14 |
| 10,945,160 B2 * | 3/2021 | Miyamoto | ........ | H04W 88/06 |
| 10,989,589 B2 * | 4/2021 | Nohmi | ........ | G01H 9/00 |
| 11,340,346 B1 * | 5/2022 | Stochino | ........ | G01S 13/865 |
| 2002/0190895 A1 * | 12/2002 | Nakanishi | ........ | G01S 13/42 342/146 |
| 2009/0096661 A1 * | 4/2009 | Sakamoto | ........ | G01S 13/345 342/92 |
| 2009/0167590 A1 * | 7/2009 | Antonsson | ........ | G01S 7/282 342/28 |
| 2010/0268683 A1 * | 10/2010 | Inoue | ........ | G01S 13/524 706/54 |

(Continued)

FOREIGN PATENT DOCUMENTS

| | | | | |
|---|---|---|---|---|
| CN | 109691125 A * | 4/2019 | ........ | H04L 7/0037 |
| JP | 5440893 B2 * | 3/2014 | ........ | G01S 13/84 |

(Continued)

*Primary Examiner* — Nuzhat Pervin
(74) *Attorney, Agent, or Firm* — Sughrue Mion, PLLC (57) ABSTRACT

An object detector includes: a transmission and reception unit that transmits a transmission wave and receives a reflection wave from an object; an acquisition unit that detects the reflection wave having a signal level above a threshold to acquire distance information indicating a distance from the transmission and reception unit to the object; a sort processing unit that sets a priority of the distance information to be higher as a difference between a signal level corresponding to the distance information and the threshold is larger when a plurality of pieces of the distance information are acquired in a predetermined period; and an output control unit that outputs the plurality of pieces of the distance information in descending order of the priority.

4 Claims, 10 Drawing Sheets

(56) References Cited

U.S. PATENT DOCUMENTS

| | | | |
|---|---|---|---|
| 2010/0271254 A1* | 10/2010 | Kanamoto | G01S 3/74 342/146 |
| 2012/0268316 A1* | 10/2012 | Kanamoto | G01S 13/584 342/158 |
| 2013/0265189 A1* | 10/2013 | Chang | G01S 13/865 342/52 |
| 2014/0204000 A1* | 7/2014 | Sato | H04W 64/00 345/2.3 |
| 2015/0338505 A1* | 11/2015 | Oshima | G01S 13/931 342/107 |
| 2016/0116441 A1* | 4/2016 | Fukuman | G01S 15/46 73/597 |
| 2016/0116583 A1* | 4/2016 | Fukuman | G01S 15/46 342/59 |
| 2016/0116591 A1* | 4/2016 | Fukuman | G01S 15/46 367/124 |
| 2016/0187476 A1* | 6/2016 | Wang | G01S 13/343 342/146 |
| 2016/0188018 A1* | 6/2016 | Handa | G06F 3/0383 345/179 |
| 2017/0237484 A1* | 8/2017 | Heath | H04B 1/525 398/26 |
| 2018/0093676 A1* | 4/2018 | Emura | G01C 21/3617 |
| 2018/0176054 A1* | 6/2018 | Kawasaki | H04L 27/04 |
| 2018/0284274 A1* | 10/2018 | LaChapelle | G01S 7/483 |
| 2019/0176967 A1* | 6/2019 | Ohata | B64C 13/20 |
| 2019/0250263 A1* | 8/2019 | Watanabe | G01S 13/52 |
| 2019/0261223 A1* | 8/2019 | Miyamoto | H04L 7/0037 |
| 2019/0274112 A1* | 9/2019 | Kleinbeck | H04W 24/08 |
| 2019/0322277 A1* | 10/2019 | Kuroki | B60W 30/12 |
| 2019/0371085 A1* | 12/2019 | Kishikawa | G07C 5/02 |
| 2020/0003917 A1* | 1/2020 | Maeda | G06F 3/16 |
| 2020/0034591 A1* | 1/2020 | Bachelder | G06K 7/10811 |
| 2020/0191913 A1* | 6/2020 | Zhang | G01S 7/412 |
| 2020/0209388 A1* | 7/2020 | Ding | G01S 15/104 |
| 2020/0222029 A1* | 7/2020 | Baba | G01S 15/8927 |
| 2021/0053555 A1* | 2/2021 | Sugiyama | B60W 30/06 |
| 2021/0247486 A1* | 8/2021 | Kashiwagi | H01Q 21/065 |
| 2021/0250118 A1* | 8/2021 | Roth-Mandutz | H04W 72/56 |
| 2021/0356583 A1* | 11/2021 | Kutomi | G01S 15/101 |
| 2022/0365193 A1* | 11/2022 | Wetoschkin | G01S 7/4026 |

FOREIGN PATENT DOCUMENTS

| | | | | |
|---|---|---|---|---|
| JP | 2015-004562 A | | 1/2015 | |
| JP | 2016-80648 A | | 5/2016 | |
| JP | 2017158622 A | * | 9/2017 | ............ A61B 8/06 |
| WO | WO-2015017670 A2 | * | 2/2015 | ............ G01S 5/18 |

\* cited by examiner

OBJECT DETECTOR

CROSS REFERENCE TO RELATED APPLICATIONS

This application is based on and claims priority under 35 U.S.C. § 119 to Japanese Patent Application No. 2020-102611, filed on Jun. 12, 2020, the entire content of which is incorporated herein by reference.

TECHNICAL FIELD

This disclosure generally relates to an object detector.

BACKGROUND DISCUSSION

There is a technique in which a time of flight (TOF) is used in a device for detecting an object as distance information indicating the distance to an object, the TOF being the time until a transmission wave such as an ultrasonic wave or a millimeter wave is reflected on the object and returned.

For example, there has been disclosed a technique for detecting the location of an object by performing triangulation calculation on the basis of a plurality of pieces of distance information acquired by a plurality of sensors that transmit transmission waves and receive reflection waves from the object (Japanese Patent Laid-Open No. 2016-80648).

In some cases, a plurality of pieces of distance information (TOF, etc.) are detected in a predetermined period, and these pieces of distance information may include not only those corresponding to an object to be detected (e.g., other vehicles, people, etc.) but also those corresponding to an object not to be detected (e.g., road surface). In order to improve the detection accuracy, it is necessary to effectively use highly reliable distance information as information corresponding to the object to be detected.

A need thus exists for an object detector which is not susceptible to the drawback mentioned above.

SUMMARY

An object detector as an example of the present disclosure includes: a transmission and reception unit that transmits a transmission wave and receives a reflection wave from an object; an acquisition unit that detects the reflection wave having a signal level above a threshold to acquire distance information indicating a distance from the transmission and reception unit to the object; a sort processing unit that sets a priority of the distance information to be higher as a difference between a signal level corresponding to the distance information and the threshold is larger when a plurality of pieces of the distance information are acquired in a predetermined period; and an output control unit that outputs the plurality of pieces of the distance information in descending order of the priority.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of the present disclosure will be described below with reference to the drawings. The configurations of the embodiments described below, and the actions and effects produced by the configuration, are merely examples and are not limited to the following description.

First Embodiment

Figure 1:
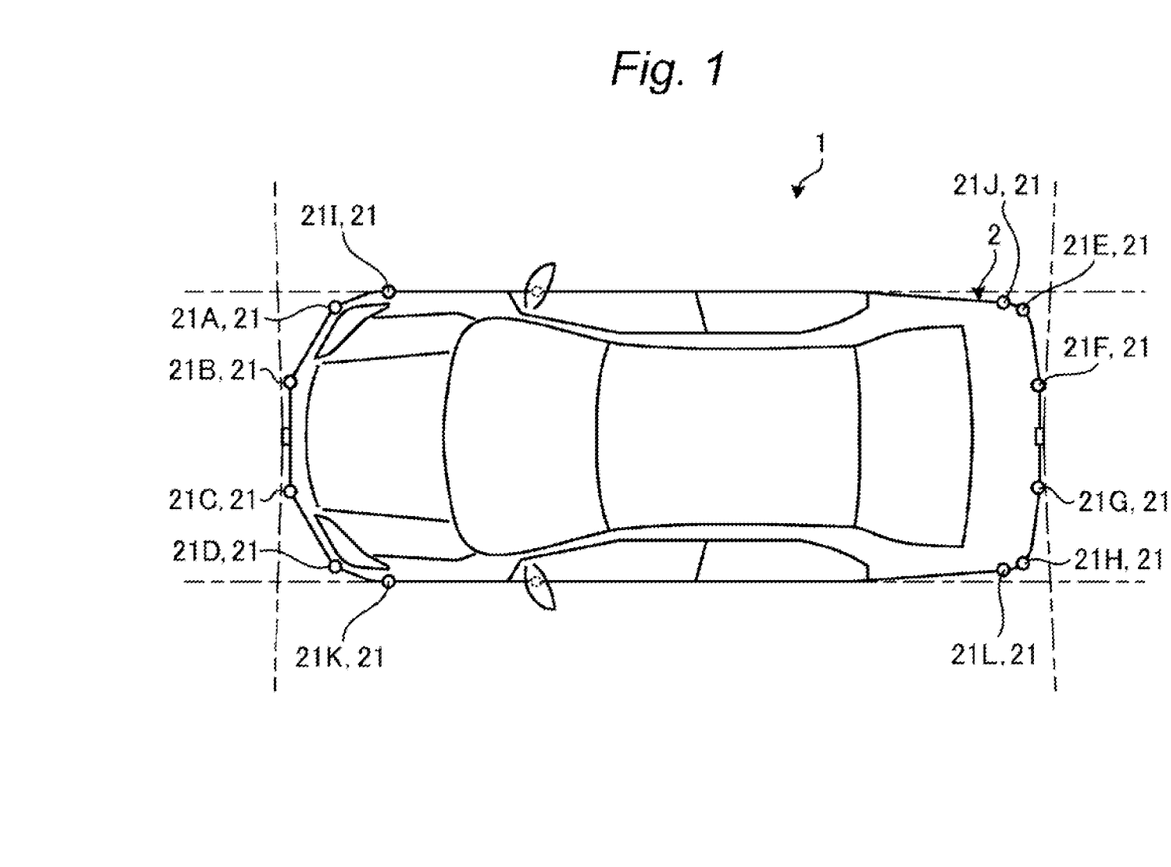
FIG. 1 is a top view illustrating an example of an appearance of a vehicle provided with a vehicle control system according to the first embodiment.

FIG. 1 is a top view illustrating an example of an appearance of a vehicle 1 provided with a vehicle control system according to the first embodiment. A vehicle control system is a system including an object detector that detects an object existing around the vehicle 1, an electronic control unit (ECU) that controls the vehicle 1 on the basis of results of detection by the object detector, and the like.

The object detector according to the present embodiment is a device for detecting information on an object (other vehicles, obstacles, people, etc.) existing around the vehicle 1 (the presence or absence of an object, the location of the object, etc.) on the basis of time-of-flight (TOF) information, Doppler shift information, and the like acquired by transmitting a transmission wave such as an ultrasonic wave from the vehicle 1 and receiving a reflection wave from the object.

The object detector according to the present embodiment has a plurality of transmission and reception units 21A to 21L (hereinafter, these may be collectively referred to as a transmission and reception unit 21.). Each transmission and reception unit 21 is installed in a vehicle body 2 as an exterior of the vehicle 1, transmits a transmission wave toward the outside of the vehicle body 2, and receives a reflection wave from an object existing outside the vehicle body 2. In the example illustrated in FIG. 1, four transmission and reception units 21A to 21D are disposed at the front end of the vehicle body 2, four transmission and reception units 21E to 21H are disposed at the rear end thereof, two transmission and reception units 21I and 21J are disposed on the right side surface, and two transmission and reception units 21K and 21L are disposed on the left side surface. Note that the number and installation position of the transmission and reception unit 21 are not limited to the above example.

Figure 2:
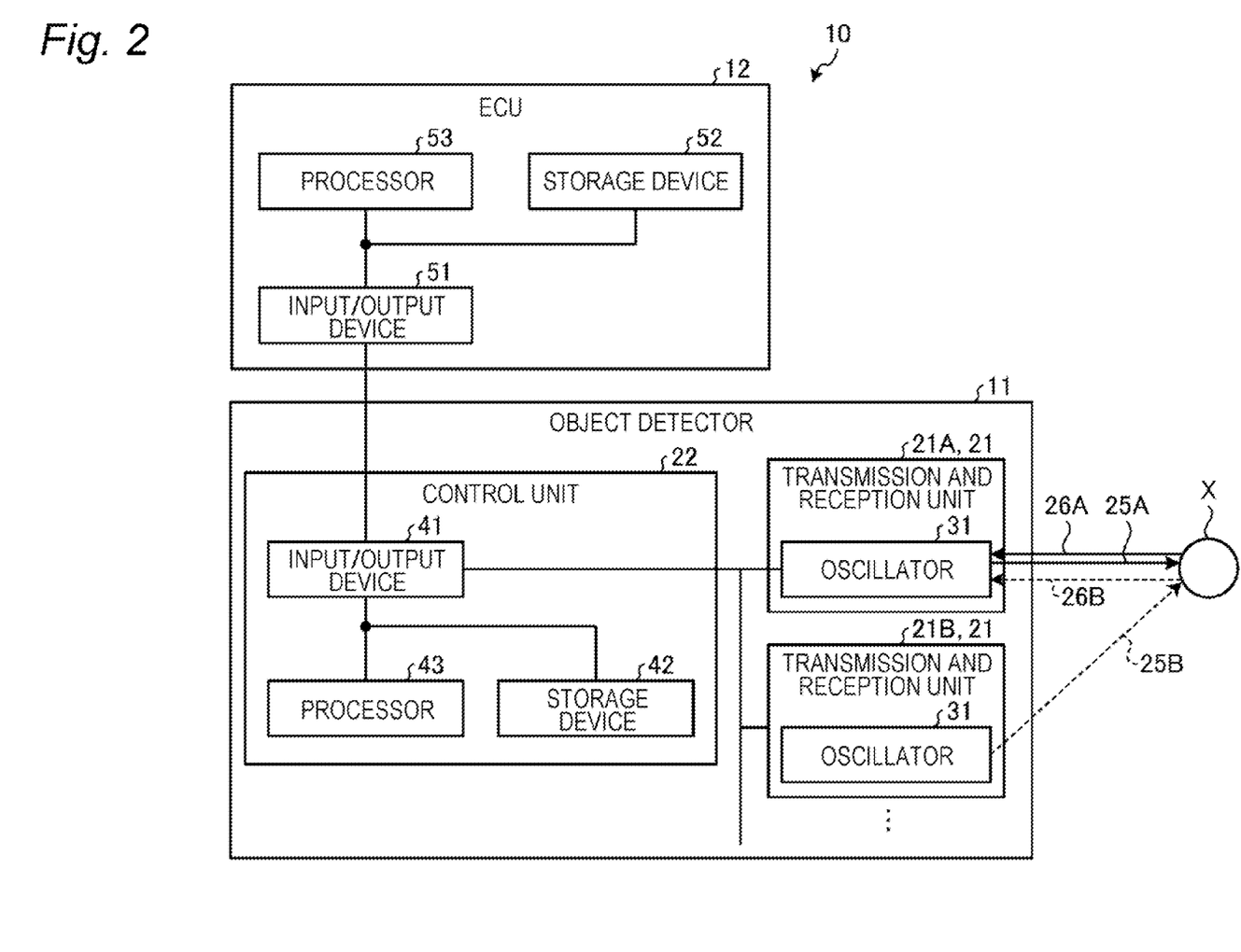
FIG. 2 is a block diagram illustrating an example of a hardware configuration of the vehicle control system according to the first embodiment.

FIG. 2 is a block diagram illustrating an example of a hardware configuration of a vehicle control system 10 according to the first embodiment. The vehicle control system 10 according to the present embodiment includes an object detector 11 and an ECU 12.

The object detector 11 has the plurality of transmission and reception units 21 and a control unit 22.

Each transmission and reception unit 21 illustrated in FIG. 2 has an oscillator 31 configured using a piezoelectric element or the like and achieves transmission and reception of ultrasonic waves by the oscillation of the oscillator 31. Specifically, each transmission and reception unit 21 transmits an ultrasonic wave generated in response to the oscillation of the oscillator 31 as a transmission wave and detects the oscillation of the oscillator 31 caused by the reflection wave of the transmission wave reflected by an object X.

Each transmission and reception unit 21 can receive not only the reflection wave corresponding to the transmission wave transmitted by itself but also the reflection wave corresponding to the transmission wave transmitted by another transmission and reception unit 21. For example, as illustrated in FIG. 2, the first transmission and reception unit 21A receives a direct wave 26A which is a reflection wave of a transmission wave 25A, transmitted from the first transmission and reception unit 21A, reflected by the object X and receives an indirect wave 26B which is a reflection wave of the transmission wave 25B, transmitted from the second transmission and reception unit 21B, reflected by the object X. In order to discriminate the direct wave 26A and the indirect wave 26B, appropriate discrimination processing (e.g., frequency modulation, phase modulation, etc.) is applied to each transmission wave. From each of the direct wave 26A and the indirect wave 26B, TOF information indicating the distance to the object X, Doppler shift information indicating the speed (relative speed) of the object X, and the like can be acquired.

Note that the relationship between the direct wave and the indirect wave is not limited to the above example. The first transmission and reception unit 21A may receive the indirect wave from another transmission and reception unit 21 (e.g., third transmission and reception unit 21C, ninth transmission and reception unit 21I, etc.) in a positional relationship where its indirect wave can be received physically. Further, the unit capable of receiving the indirect wave is not limited to the first transmission and reception unit 21A, but the other transmission and reception units 21B to 21L may receive the indirect wave as well. Further, the example illustrated in FIG. 2 exemplifies a configuration in which both the transmission of the transmission wave and the reception of the reflection wave (direct wave and indirect wave) are performed using a single oscillator 31, but the configuration of the transmission and reception unit 21 is not limited thereto. For example, a configuration may be formed where the transmitting side and the receiving side are separated, such as a configuration where a first oscillator for transmitting a transmission wave and a second oscillator for receiving a reflection wave are separately provided.

The control unit 22 includes an input/output device 41, a storage device 42, and a processor 43. The input/output device 41 is an interface device for achieving transmission and reception of information between the control unit 22 and an external device (transmission and reception unit 21, ECU 12, etc.). The storage device 42 includes a main storage device such as read-only memory (ROM) and random-access memory (RAM), and an auxiliary storage device such as a hard disk driven (HDD) and a solid-state drive (SSD). The processor 43 is an integrated circuit that executes various kinds of processing for achieving the functions of the control unit 22, the processor 43 including, for example, a central processing unit (CPU) that operates in accordance with a program, an application-specific integrated circuit (ASIC) designed for a specific application, and the like. The processor 43 reads and executes programs stored in the storage device 42 to execute various kinds of arithmetic processing and control processing.

The ECU 12 is a unit that performs various kinds of processing for controlling the vehicle 1 on the basis of various pieces of information acquired from the object detector 11 or the like. The ECU 12 includes an input/output device 51, a storage device 52, and a processor 53. The input/output device 51 is an interface device for achieving the transmission and reception of information between the ECU 12 and an external device (object detector 11, drive mechanism, braking mechanism, steering mechanism, etc.). The storage device 52 includes a main storage device such as ROM and RAM and an auxiliary storage device such as an HDD and an SSD. The processor 53 is an integrated circuit that executes various kinds of processing for achieving the functions of the ECU 12, the processor 53 including a CPU, an ASIC, and the like, for example. The processor 53 reads the program stored in the storage device 52 and executes various kinds of arithmetic processing and control processing.

Figure 3:
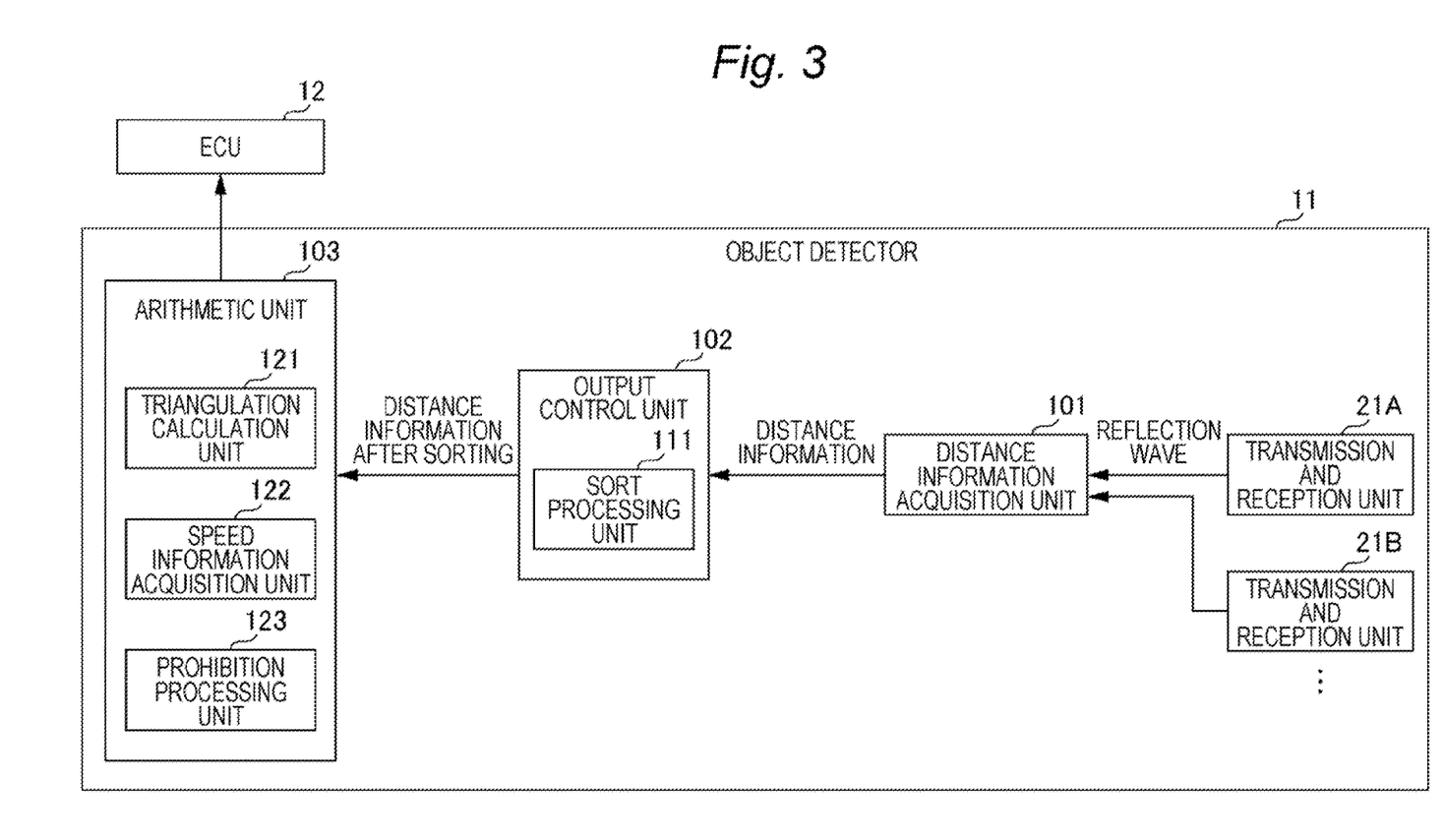
FIG. 3 is a block diagram illustrating an example of a functional configuration of the object detector according to the first embodiment.

FIG. 3 is a block diagram illustrating an example of the functional configuration of the object detector 11 according to the first embodiment. The object detector 11 includes a distance information acquisition unit 101, an output control unit 102, and an arithmetic unit 103. Each of these functional units 101 to 103 is achieved by cooperation of hardware components of the object detector 11 as illustrated in FIG. 2 and software components such as programs.

The distance information acquisition unit 101 acquires distance information indicating the distance from the transmission and reception unit 21 to the object X on the basis of a change over time in the signal level (reception intensity) of each of the reflection waves (direct wave and indirect wave) received by each transmission and reception unit 21. The distance information is, for example, a TOF, a distance calculated from the TOF, or the like. For example, the distance information acquisition unit 101 acquires a direct TOF, which is a TOF calculated on the basis of the direct wave received by each transmission and reception unit 21, and an indirect TOF, which is a TOF calculated on the basis of the indirect wave received by each transmission and reception unit 21.

The output control unit 102 controls the output of the distance information acquired by the distance information acquisition unit 101. The output control unit 102 according to the present embodiment performs processing for outputting a plurality of pieces of distance information in descending order of priority (reliability). The output control unit 102 has a sort processing unit 111.

When a plurality of pieces of distance information are acquired in a predetermined period, the sort processing unit 111 sets the priority of the distance information to be higher as the difference between the signal level of the reflection wave (direct wave or indirect wave) corresponding to the distance information and a predetermined threshold is larger. The output control unit 102 outputs the plurality of pieces of distance information to the arithmetic unit 103 in descending order of priority. The predetermined period may be, for example, one detection cycle (waiting time for the reflection wave) from the transmission of one transmission wave to the transmission of the next transmission wave, or the like. The predetermined threshold may be, for example, a threshold set for distinguishing an object to be detected (e.g., other vehicles, people, etc.) from an object not to be detected (e.g., road surface), or the like.

The larger the difference between the signal level of the reflection wave and the threshold, the higher the reliability of the detected distance information can be determined to be. Therefore, by setting the priorities (output order) for the plurality of pieces of distance information on the basis of the difference, it is possible to preferentially output the distance information having higher reliability.

The arithmetic unit 103 uses the distance information output from the output control unit 102 to perform a calculation for generating information on an object existing around the vehicle 1. The arithmetic unit 103 according to the present embodiment includes a triangulation calculation unit 121, a speed information acquisition unit 122, and a prohibition processing unit 123.

A triangulation calculation unit 121 performs triangulation calculation for detecting the location of the object on the basis of first distance information calculated on the basis of the direct wave and second distance information calculated on the basis of the indirect wave. The first distance information is the direct TOF or the like. The second distance information is the indirect TOF or the like.

A speed information acquisition unit 122 acquires first speed information based on the direct wave and second speed information based on the indirect wave. The first speed information may be a Doppler shift amount calculated on the basis of the direct wave, a relative speed calculated on the basis of the Doppler shift amount, or the like. The second speed information may be a Doppler shift amount calculated on the basis of the indirect wave, a relative speed calculated on the basis of the Doppler shift amount, or the like.

When the difference between the first speed information and the second speed information exceeds a predetermined range, the prohibition processing unit 123 prohibits the execution of the triangulation calculation based on the first distance information and the second distance information by the triangulation calculation unit 121.

When the error between the first speed information based on the direct wave and the second speed information based on the indirect wave is large, there is a high possibility that the object captured by the direct wave is different from the object captured by the indirect wave. In such a case, the accuracy is low in the triangulation calculation performed using the first distance information based on the direct wave and the second distance information based on the indirect wave. Thus, performing the processing by the prohibition processing unit 123 can prevent the execution of the triangulation calculation with low accuracy.

The object detector 11 according to the present embodiment detects an object by a TOF method using ultrasonic waves. The TOF method is a technique for calculating a distance to an object on the basis of a difference between the timing at which a transmission wave is transmitted (more specifically, the transmission wave begins to be transmitted) and the timing at which a reflection wave is received (more specifically, the reflection wave begins to be received.).

Figure 4:
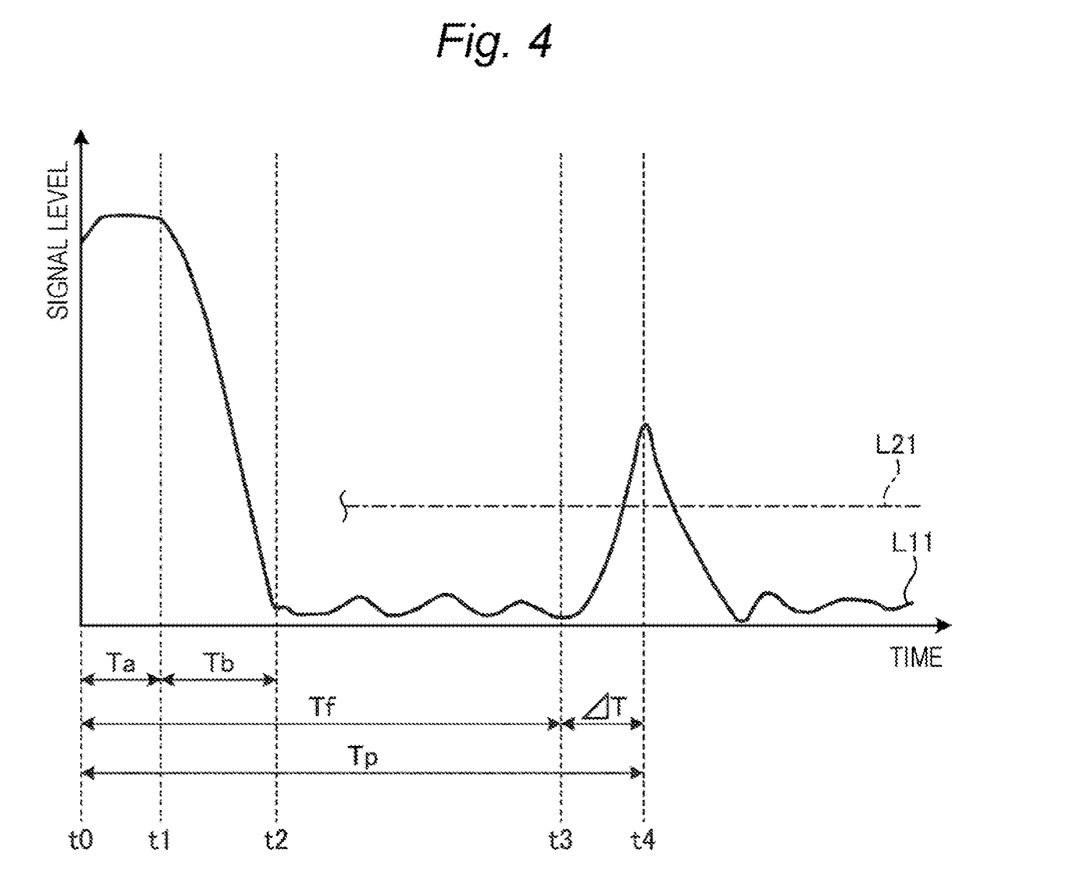
FIG. 4 is a diagram for explaining an outline of a TOF method according to the first embodiment.

FIG. 4 is a diagram for explaining the outline of the TOF method according to the first embodiment. FIG. 4 illustrates an envelope indicating a change over time in the signal level of the ultrasonic wave transmitted and received by the transmission and reception unit 21. In the graph illustrated in FIG. 4, the horizontal axis corresponds to the time, and the vertical axis corresponds to the signal level.

A solid line L11 represents an example of the envelope representing the change over time in the signal level of the signal transmitted and received by the transmission and reception unit 21, that is, the degree of oscillation of the oscillator 31. It can be seen from the solid line L11 that the oscillator 31 is driven for just time Ta from timing t0 to oscillate, so that the transmission of the transmission wave is completed at timing t1, and then the oscillation of the oscillator 31 due to inertia continues while being attenuated for time Tb until timing t2. Therefore, in the graph illustrated in FIG. 4, time Tb corresponds to the so-called reverberation time.

The solid line L11 reaches a peak at timing t4 when just time Tp elapses from timing t0 at which the transmission of the transmission wave begins, the peak being where the degree of oscillation of the oscillator 31 is above (or becomes equal to or higher than) a predetermined threshold represented by a dashed-dotted line L21. The threshold is a preset value for identifying whether the oscillation of the oscillator 31 is caused by the reception of the reflection wave from the object to be detected or by the reception of the reflection wave from the object not to be detected. Although an example is illustrated here in which the threshold represented by the dashed-dotted line L21 has been set as a constant value that does not change with the passage of time, the threshold may be set as a value that changes with the passage of time.

The oscillation having the peak above (or equal to or higher than) the threshold represented by the dashed-dotted line L21 can be considered to be caused by the reception of the reflection wave from the object to be detected. On the other hand, the oscillation having a peak equal to or lower than (or below) the threshold can be considered to be caused by the reception of the reflection wave from the object not to be detected. Accordingly, it can be seen from the solid line L11 that the oscillation of the oscillator 31 at timing t4 is caused by the reception of the reflection wave from the object to be detected.

In the solid line L11, the oscillation of the oscillator 31 is attenuated after timing t4. Therefore, timing t4 corresponds to the timing at which the reception of the reflection wave from the object to be detected is completed, or in other words, the timing at which the last transmission wave transmitted at timing t1 returns as the reflection wave.

Further, in the solid line L11, timing t3 as the start point of the peak at timing t4 corresponds to the timing at which the reception of the reflection wave from the object to be detected begins, or in other words, the timing at which the first transmission wave transmitted at timing t0 returns as the reflection wave. Therefore, the time $\Delta T$ between timing t3 and timing t4 is equal to time Ta as the transmission time of the transmission wave.

In view of the above, in order to determine the distance to the object to be detected by the TOF method, it is necessary to determine time Tf between timing t0 at which the transmission wave begins to be transmitted and timing t3 at which the reflection wave begins to be received. Time Tf can be obtained by subtracting the time $\Delta T$, which is equal to time Ta as the transmission time of the transmission wave, from time Tp as the difference between timing t0 and timing t4 at which the signal level of the reflection wave reaches the peak above the threshold.

Timing t0 at which the transmission wave begins to be transmitted can be easily specified as the timing at which the object detector 11 begins its operation, and time Ta as the transmission time of the transmission wave is predetermined by setting or the like. Therefore, by specifying timing t4 at which the signal level of the reflection wave reaches the peak above the threshold, the distance to the object to be detected can be obtained.

The distance information acquisition unit 101 according to the present embodiment performs the processing as described above on the direct wave and the indirect wave acquired from each transmission and reception unit 21 and acquires a direct TOF (first distance Information) based on the direct wave and an indirect TOF (second distance Information) based on the indirect wave. Then, when a plurality of TOFs (direct TOF or indirect TOF) are acquired in a predetermined period, the sort processing unit 111 according to the present embodiment sets the priority of each TOF such that the larger the difference between the signal level corresponding to the TOF and the threshold, the higher the priority. The output control unit 102 according to the present embodiment then outputs the plurality of TOFs to the arithmetic unit 103 in descending order of the set priority.

Figure 5:
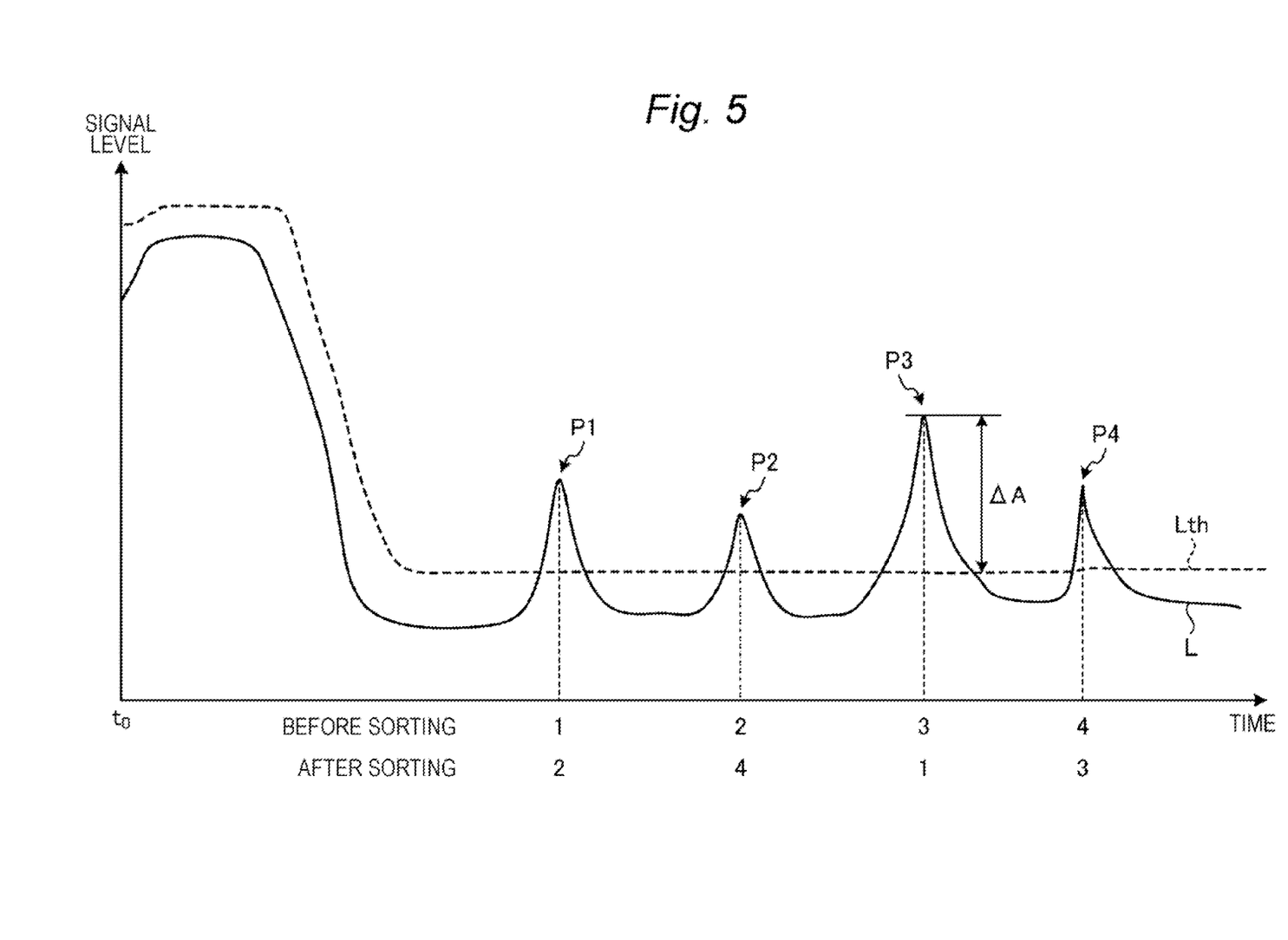
FIG. 5 is a diagram illustrating an example of processing by a sort processing unit according to the first embodiment.

FIG. 5 is a diagram illustrating an example of processing by the sort processing unit 111 according to the first embodiment. FIG. 5 illustrates an envelope L indicating a change over time in a signal level of a reflection wave (direct wave or indirect wave) in a detection cycle of one time and a threshold line Lth indicating a threshold for detecting a TOF (direct TOF or indirect TOF). FIG. 5 illustrates an example in which four peaks P1 to P4 corresponding to four TOFs 1 to 4 have been detected in one detection cycle.

As illustrated in FIG. 5, the priority before the sorting of each of the TOFs 1 to 4 is determined on the basis of ascending order of the elapsed time from timing t0 at which the transmission wave is transmitted to the detection of each of the corresponding peaks P1 to P4, that is, the time at which each of the peaks P1 to P4 was detected. In this case, the four TOFs 1 to 4 are output to the arithmetic unit 103 in the order of: TOF 1→TOF 2→TOF 3→TOF 4.

On the other hand, the priority after the sorting of each of the TOFs 1 to 4 is determined in descending order of a difference ΔA between the signal level of each of the peaks P1 to P4 on the envelope L and the threshold represented by the threshold line Lth. In this case, the four TOFs 1 to 4 are output to the arithmetic unit 103 in the order of: TOF 3→TOF 1→TOF 4→TOF 2.

The larger the difference ΔA, the higher the possibility that the detected peak corresponds to the object to be detected (the lower the possibility that the detected peak is caused by noise such as road clutter.). Thus, by setting the priorities of the TOFs 1 to 4 (output order) on the basis of the difference ΔA as described above, it is possible to preferentially output the TOF having higher reliability to the arithmetic unit 103.

Figure 6:
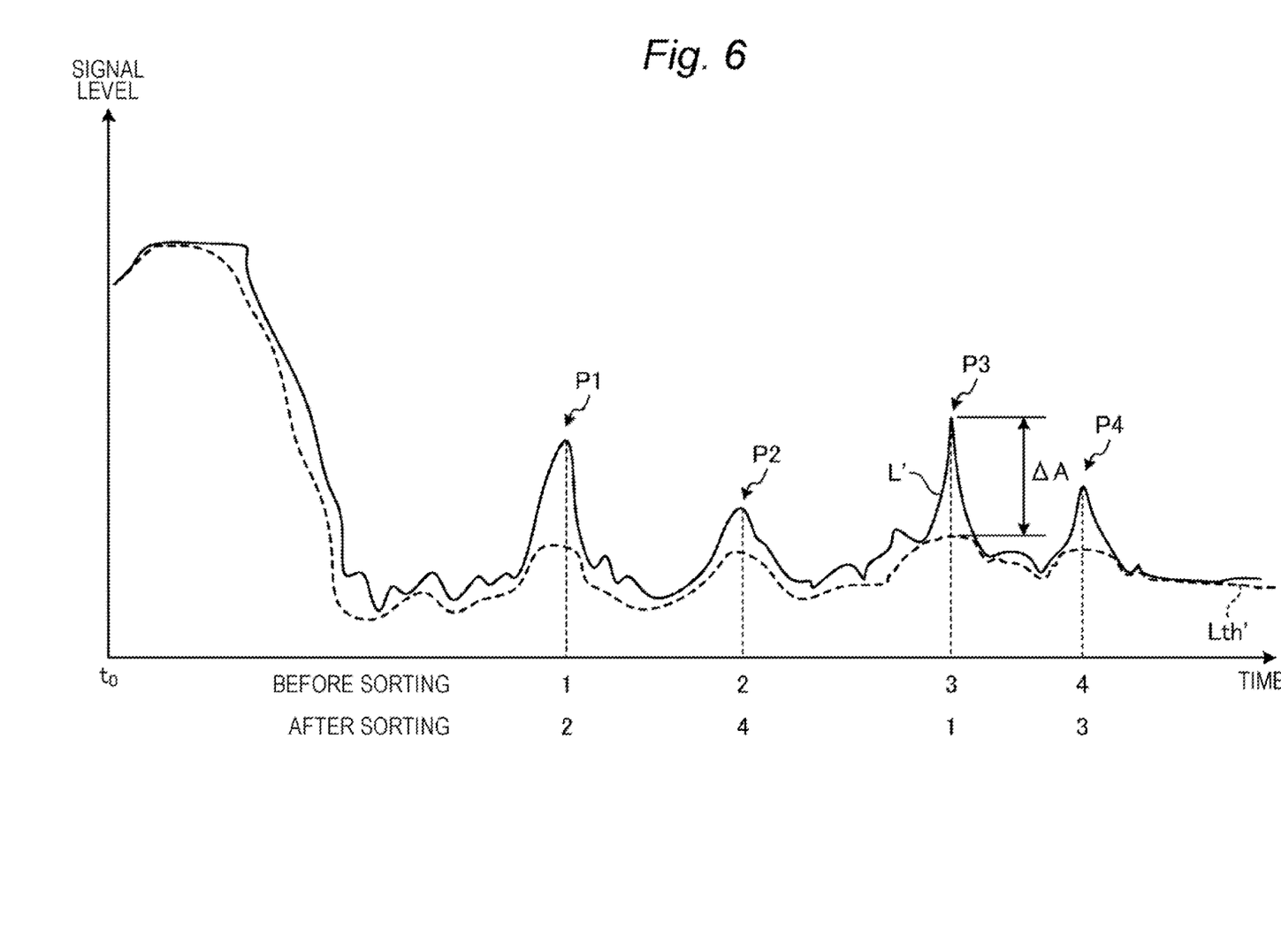
FIG. 6 is a diagram illustrating another example of the processing by the sort processing unit according to the first embodiment.

FIG. 6 is a diagram illustrating another example of the processing by the sort processing unit 111 according to the first embodiment. FIG. 6 illustrates an envelope L indicating a change over time in a signal level of a reflection wave (direct wave or indirect wave) in a detection cycle of one time and a threshold line Lth' indicating a threshold for detecting a TOF (direct TOF or indirect TOF). The threshold line Lth' in the example illustrated in FIG. 6 is a processing value obtained using a moving average value of the envelope L'. The processing value only needs to be a value with which a TOF corresponding to the object to be detected can be detected but the processing value may be, for example, a value obtained by adding or subtracting a threshold (e.g., a threshold for removing a road surface clutter or the like) based on a predetermined reference to or from the moving average value. The method for setting the priority of each of the TOFs 1 to 4 (each of the peaks P1 to P4) is as in the example illustrated in FIG. 5. As thus described, by setting the threshold for detecting the TOF to the processing value obtained using the moving average value, the effect of removing noise such as road clutter can be improved.

Figure 7:
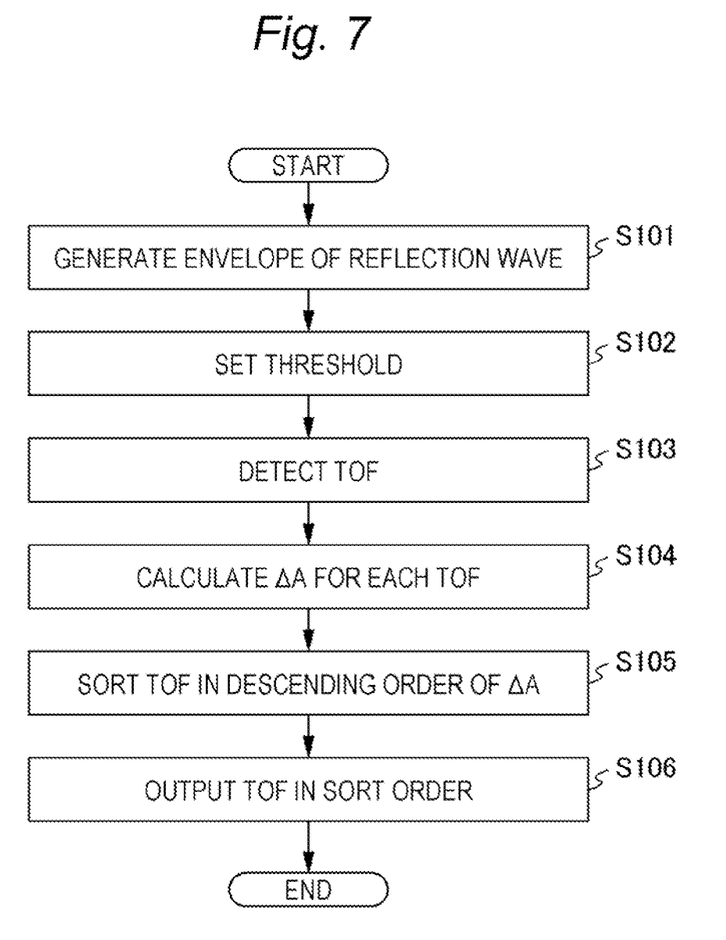
FIG. 7 is a flowchart illustrating an example of processing by a distance information acquisition unit and an output control unit according to the first embodiment.

FIG. 7 is a flowchart illustrating an example of the processing by the distance information acquisition unit 101 and the output control unit 102 according to the first embodiment. The distance information acquisition unit 101 generates an envelope of a reflection wave (direct wave and/or indirect wave) received by the transmission and reception unit 21 (S101) and sets a threshold for detecting a TOF (S102). At this time, the distance information acquisition unit 101 may generate the envelope and set the threshold on the basis of data after constant false alarm rate (CFAR) processing. The CFAR processing is processing for acquiring a difference signal obtained by subtracting a moving average value from a signal level of a reflection wave to be processed. The use of CFAR processing can lead to a reduction in the influence of noise such as road clutter. Thereafter, the distance information acquisition unit 101 detects a TOF from a reflection wave having a signal level above the threshold (S103).

The sort processing unit 111 of the output control unit 102 calculates the difference ΔA (the difference between the signal level of each of the peaks P1 to P4 and the threshold represented by the threshold lines Lth, Lth') for each detected TOF (S104), and sorts the plurality of TOFs in descending order of the difference ΔA (S105). The output control unit 102 outputs the plurality of TOFs to the arithmetic unit 103 in the sort order (S106).

By the processing as described above, it is possible to preferentially output the TOF having higher reliability to the arithmetic unit 103.

The triangulation calculation unit 121 of the arithmetic unit 103 performs triangulation calculation for detecting the location of the object on the basis of the sorted distance information, output from the output control unit 102 as described above, that is, first distance information (direct TOF) having a higher priority (reliability) and second distance information (indirect TOF). The speed information acquisition unit 122 acquires first speed information (Doppler shift amount or relative speed) based on the first distance information and second speed information (Doppler shift amount or relative speed) based on the second distance information. When the difference between the first speed information and the second speed information exceeds a predetermined range, the prohibition processing unit 123 prohibits the execution of the triangulation calculation based on the first distance information and the second distance information.

Figure 8:
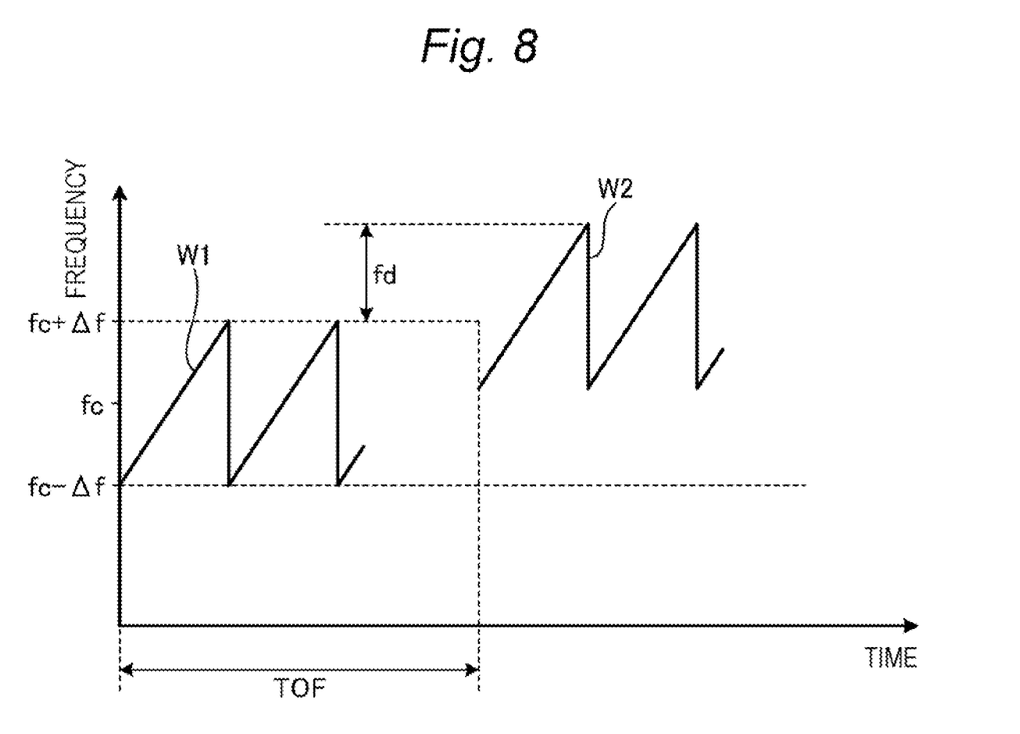
FIG. 8 is a diagram illustrating an example of the Doppler shift generated between a transmission wave transmitted from a transmission and reception unit and a reflection wave from an object according to the first embodiment.

Here, the Doppler shift will be described. FIG. 8 is a diagram illustrating an example of the Doppler shift generated between the transmission wave transmitted from the transmission and reception unit 21 and the reflection wave from the object according to the first embodiment. In the figure, a case is illustrated where frequency modulation is performed on the transmission wave so as to change its frequency into a sawtooth shape. The horizontal axis in the figure corresponds to the time, and the vertical axis corresponds to the frequencies of the transmission wave and the reflection wave.

A waveform W1 represents the frequency characteristic of the transmission wave, and a waveform W2 represents the frequency characteristic of the reflection wave. The waveform W1 of the transmission wave is a waveform corresponding to a chirp signal with its instantaneous frequency changing in the range from fc−Δf to fc+Δf.

When the relative distance between the object and the transmission and reception unit 21 is decreasing (when the vehicle 1 and/or the object are moving so as to come closer to each other), the frequency band of the reception wave indicated by the waveform W2 shifts to a higher frequency side than the frequency band of the transmission wave indicated by the waveform W1 due to the Doppler effect. At this time, although there is a difference in the frequency band between the waveform W1 and the waveform W2, a common waveform characteristic in which the frequency changes into the sawtooth shape with the passage of time appears. Therefore, by extracting a signal having a similar waveform characteristic to the waveform W1 from the signal acquired after the transmission of the transmission wave, the waveform W2 of the reflection wave corresponding to the transmission wave can be specified. When the relative distance is increasing (when the vehicle 1 and/or the object are moving so as to be separated from each other), the frequency band indicated by the waveform W2 shifts to a lower frequency side than the frequency band indicated by the waveform W1.

As described above, by specifying the correspondence between the waveform W1 and the waveform W2, it is possible to obtain the TOF corresponding to the distance to the object and a Doppler shift amount (frequency difference) fd generated between the transmission wave and the reflection wave can be obtained. The relative speed of the object with respect to the vehicle 1 (transmission and reception unit 21) can be calculated on the basis of the Doppler shift amount fd.

Figure 9:
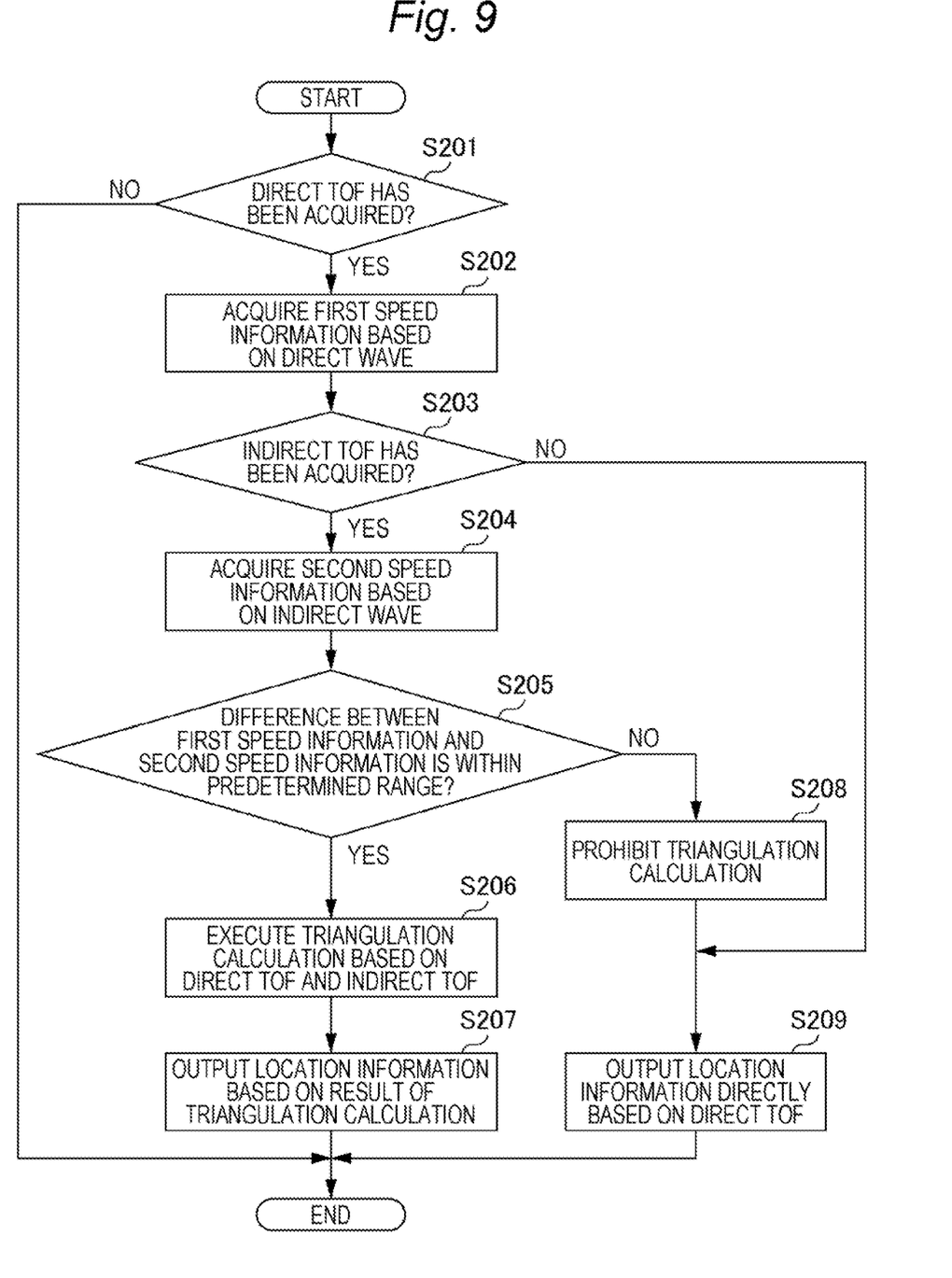
FIG. 9 is a flowchart illustrating an example of processing by an arithmetic unit according to the present embodiment.

FIG. 9 is a flowchart illustrating an example of processing by the arithmetic unit 103 according to the present embodiment. First, the speed information acquisition unit 122 determines whether or not the direct TOF (first distance Information) has been acquired from the output control unit 102 (S201), and when the direct TOF has not been acquired (S201: No), the present routine ends. On the other hand, when the direct TOF has been acquired (S201: Yes), the speed information acquisition unit 122 acquires first speed information (Doppler shift amount or relative speed) based on the direct wave (S202).

Thereafter, the speed information acquisition unit 122 determines whether or not the indirect TOF (second distance Information) has been acquired from the output control unit 102 (S203), and when the indirect TOF has not been acquired (S203: No), the arithmetic unit 103 outputs the location information, generated using only the direct TOF, to the ECU 12 (S209). On the other hand, when the indirect TOF has been acquired (S203: Yes), the speed information acquisition unit 122 acquires second speed information (Doppler shift amount or relative speed) based on the indirect wave (S204).

The prohibition processing unit 123 determines whether or not the difference between the first speed information and the second speed information is within a predetermined range (S205), and prohibits the triangulation calculation by the triangulation calculation unit 121 when the difference is not within the predetermined range (S205: No) (S208). In this case, the arithmetic unit 103 outputs the location information generated using only the direct TOF to the ECU 12 (S209). On the other hand, when the difference between the first speed information and the second speed information is within the predetermined range (S205: Yes), the triangulation calculation unit 121 executes the triangulation calculation based on the direct TOF and the indirect TOF (S206), and the arithmetic unit 102 outputs the location information based on the result of the triangulation calculation to the ECU 12 (S207).

According to the processing as described above, when the error between the first speed information and the second speed information is large, the triangulation calculation based on the first distance information (direct TOF) and the second distance information (indirect TOF) is prohibited. This makes it possible to prevent the execution of the triangulation calculation with low accuracy.

A program for causing the processor 43 or the like to execute the processing for achieving various functions in the above embodiment can be provided by recording a file in an installable format or an executable format on a computer-readable recording medium such as a compact disc read-only memory (CD-ROM), a flexible disk (FD), a compact disc recordable (CD-R), or a digital versatile disk (DVD). The program may be provided or distributed via a network such as the Internet.

According to the above embodiment, it is possible to improve the detection accuracy of the object.

Hereinafter, another embodiment will be described with reference to the drawings, but portions having the same function effects as or similar function effects to those in the first embodiment are denoted by the same reference numerals, and the description thereof may be omitted.

Second Embodiment

Figure 10:
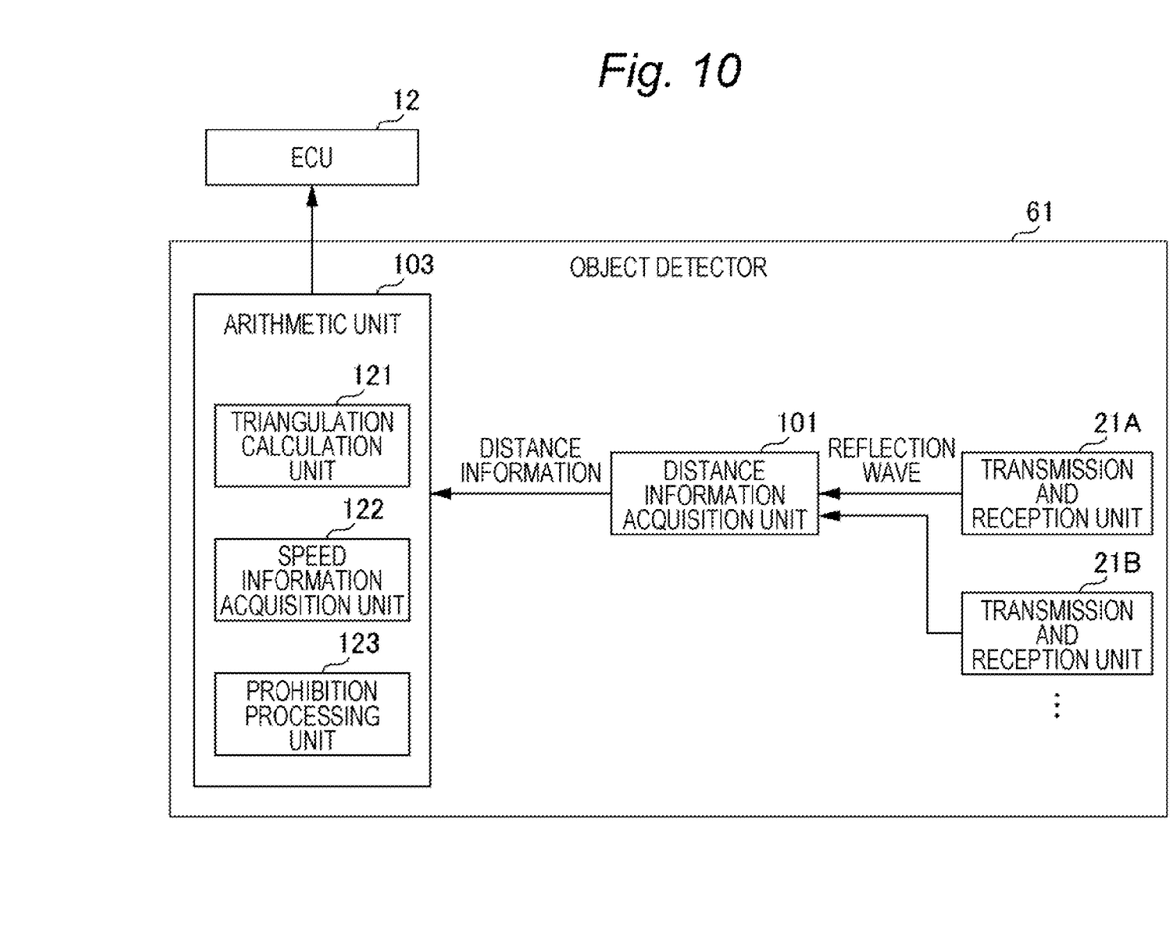
FIG. 10 is a block diagram illustrating an example of a functional configuration of an object detector according to a second embodiment.

FIG. 10 is a block diagram illustrating an example of a functional configuration of an object detector 61 according to a second embodiment. The object detector 61 according to the present embodiment is different from the object detector 11 according to the first embodiment in not including the output control unit 102 or the sort processing unit 111.

In the present embodiment, the plurality of pieces of first distance information (direct TOF) or the plurality of pieces of second distance information (indirect TOF) acquired by the distance information acquisition unit 101 are output to the arithmetic unit 103 without being set to have priorities. For example, the first distance information or the second distance information according to the present embodiment may be output in the order before the sorting illustrated in FIG. 5 or 6 (the order based on the time at which the peak corresponding to the TOF was detected).

Even with such a configuration, the accuracy of the triangulation calculation can be improved by the function of the prohibition processing unit 123, and the object can be detected with high accuracy.

An object detector as an example of the present disclosure includes: a transmission and reception unit that transmits a transmission wave and receives a reflection wave from an object; an acquisition unit that detects the reflection wave having a signal level above a threshold to acquire distance information indicating a distance from the transmission and reception unit to the object; a sort processing unit that sets a priority of the distance information to be higher as a difference between a signal level corresponding to the distance information and the threshold is larger when a plurality of pieces of the distance information are acquired in a predetermined period; and an output control unit that outputs the plurality of pieces of the distance information in descending order of the priority.

According to the above configuration, the distance information having a larger difference between the signal level and the threshold is output preferentially. This is because the larger the difference, the higher the reliability of the detected distance information can be determined to be. Thus, the distance information having higher reliability can be preferentially used, and the detection accuracy of the object can be improved.

In the object detector, the predetermined period is one detection cycle from the transmission of one transmission wave to the transmission of a next transmission wave.

According to the above configuration, it is possible to preferentially output the distance information having higher reliability for each detection cycle.

In the object detector, the threshold may be a processing value obtained using a moving average value.

With the above configuration, noise components such as road clutter can be eliminated effectively.

The object detector may further include: a triangulation calculation unit that performs triangulation calculation for detecting a location of the object on a basis of first distance information calculated on a basis of a direct wave obtained by a transmission wave being transmitted from a first transmission and reception unit, reflected by the object, and received by the first transmission and reception unit, and second distance information calculated on a basis of an indirect wave obtained by a transmission wave being transmitted from a second transmission and reception unit, reflected by the object, and received by the first transmission and reception unit, the second transmission and reception unit being disposed at a location different from the first transmission and reception unit; and a prohibition processing unit that prohibits the triangulation calculation when a difference between first speed information indicating a speed of the object calculated on a basis of a first reflection wave and second speed information indicating a speed of the object calculated on a basis of a second reflection wave exceeds a predetermined range.

According to the above configuration, the triangulation calculation can be performed using the first distance information with a higher priority and the second distance information. When the difference between the first speed information and the second speed information is large, the prohibition processing unit prohibits the triangulation calculation based on the first distance information and the second distance information. That is, the first distance information and the second distance information used for the triangulation calculation are narrowed down to those having higher reliability. This makes it possible to further improve the detection accuracy of the object.

While the embodiments of the present disclosure have been described above, the embodiments described above are merely examples and are not intended to limit the scope of the present disclosure. The novel embodiments described above may be implemented in a variety of forms, and various omissions, substitutions, and modifications may be made without departing from the scope of the present disclosure. The embodiments described above are included in the scope and gist of the present disclosure and are also included in the scope of the present disclosure described in the claims and a scope equivalent thereto.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An object detector comprising:
   at least one processor configured to implement:
   a transmission and reception unit that transmits a transmission wave and receives a reflection wave from a plurality objects;
   an acquisition unit that detects the reflection wave having a signal level including a plurality of peaks above a threshold to acquire a plurality of pieces of distance information each indicating a distance from the transmission and reception unit to each of the plurality of objects corresponding to each peak;
   a sort processing unit that sets a priority of the distance information to be higher as a difference between each of the peaks in the signal level corresponding to the distance information and the threshold is larger when the plurality of pieces of the distance information are acquired in a predetermined period; and
   an output control unit that outputs the plurality of pieces of the distance information in descending order of the priority.

2. The object detector according to claim 1, wherein the predetermined period is one detection cycle from transmission of one transmission wave to transmission of a next transmission wave.

3. The object detector according to claim 1, wherein the threshold is a processing value obtained using a moving average value.

4. The object detector according to claim 1, further comprising:
   a triangulation calculation unit that performs triangulation calculation for detecting a location of the object on a basis of first distance information calculated on a basis of a direct wave obtained by a transmission wave being transmitted from a first transmission and reception unit, reflected by the object, and received by the first transmission and reception unit, and second distance information calculated on a basis of an indirect wave obtained by a transmission wave being transmitted from a second transmission and reception unit, reflected by the object, and received by the first transmission and reception unit, the second transmission and reception unit being disposed at a locations different from the first transmission and reception unit; and
   a prohibition processing unit that prohibits the triangulation calculation when a difference between first speed information indicating a speed of the object calculated on a basis of the direct wave and second speed information indicating a speed of the object calculated on a basis of the indirect wave exceeds a predetermined range.

* * * * *